US012280562B2

(12) United States Patent
Wu et al.

(10) Patent No.: US 12,280,562 B2
(45) Date of Patent: Apr. 22, 2025

(54) TOILET LID AND SEAT COMPRISING FIBER REINFORCED CEMENT BOARD, FIBER REINFORCED CALCIUM SILICATE BOARD OR SINTERED STONE

(71) Applicant: Topseat International, Inc., Plano, TX (US)

(72) Inventors: Chengdong Wu, Lucas, TX (US); Jie Zhang, Lucas, TX (US)

(73) Assignee: Topseat International, Inc., Plano, TX (US)

( * ) Notice: Subject to any disclaimer, the term of this patent is extended or adjusted under 35 U.S.C. 154(b) by 121 days.

(21) Appl. No.: 18/062,485

(22) Filed: Dec. 6, 2022

(65) Prior Publication Data

US 2024/0181747 A1 Jun. 6, 2024

(51) Int. Cl.
*B32B 13/06* (2006.01)
*A47K 13/00* (2006.01)
(Continued)

(52) U.S. Cl.
CPC .............. *B32B 13/06* (2013.01); *A47K 13/00* (2013.01); *B32B 9/002* (2013.01); *B32B 9/04* (2013.01);
(Continued)

(58) Field of Classification Search
CPC ........... B32B 13/06; B32B 9/002; B32B 9/04; B32B 13/02; B32B 15/20; B32B 2255/00; A47K 13/00
(Continued)

(56) References Cited

U.S. PATENT DOCUMENTS 1,829,526 A 10/1931 Leslie
3,484,876 A 12/1969 Thomas
(Continued)

FOREIGN PATENT DOCUMENTS

CN 2506195 Y 8/2002
CN 1422589 A 6/2003
(Continued)

OTHER PUBLICATIONS

International Search Report and Written Opinion of the International Searching Authority dated May 8, 2023, in connection with International Application No. PCT/US2022/081037, 10 pages.
(Continued)

*Primary Examiner* — Lori L Baker

(57) ABSTRACT

The present disclosure is generally directed to toilet equipment, and more particularly to a toilet lid and seat that comprises fiber reinforced cement board, fiber reinforced calcium silicate board or sintered stone. In an embodiment, a toilet lid or seat includes a core structural layer having a shape and size associated with the toilet lid, and having a first surface and a second surface opposite the first surface, wherein the core structural layer comprises fiber reinforced cement board or fiber reinforced calcium silicate board. In another embodiment, a toilet lid includes a core structural layer having a shape and size associated with the toilet lid, and having a first surface and a second surface opposite the first surface, wherein the core structural layer comprises sintered stone.

14 Claims, 2 Drawing Sheets

(51) Int. Cl.
*B32B 9/00* (2006.01)
*B32B 9/04* (2006.01)
*B32B 13/02* (2006.01)
*B32B 15/20* (2006.01)

(52) U.S. Cl.
CPC .............. *B32B 13/02* (2013.01); *B32B 15/20* (2013.01); *B32B 2255/00* (2013.01)

(58) Field of Classification Search
USPC ....................................... 4/237, 234, 98, 217
See application file for complete search history.

(56) References Cited

U.S. PATENT DOCUMENTS

| | | | |
|---|---|---|---|
| 5,475,515 | A | 12/1995 | Yoshinaga et al. |
| 5,829,073 | A | 11/1998 | Lee |
| 5,896,230 | A | 4/1999 | Goggins |
| 8,506,742 | B2 | 8/2013 | Terfloth et al. |
| 9,648,998 | B2 * | 5/2017 | Wu ........................ A47K 13/02 |
| 2004/0096601 | A1 | 5/2004 | Raymond |
| 2004/0108606 | A1 | 6/2004 | Goggins |
| 2005/0076424 | A1 | 4/2005 | Mattingly |
| 2005/0120469 | A1 | 6/2005 | Benkhardt et al. |
| 2005/0186393 | A1 | 8/2005 | Wilson |
| 2006/0003155 | A1 | 1/2006 | Stewart |
| 2007/0144659 | A1 | 6/2007 | De La Fuente |
| 2007/0169255 | A1 | 7/2007 | Benkhardt et al. |
| 2007/0298229 | A1 | 12/2007 | Rasmusson et al. |
| 2008/0008885 | A1 | 1/2008 | Terfloth et al. |
| 2008/0283391 | A1 * | 11/2008 | Ogawa ................... C02F 1/288 204/242 |
| 2009/0068453 | A1 | 3/2009 | Chung |
| 2009/0155593 | A1 | 6/2009 | O'Brien et al. |
| 2010/0101016 | A1 | 4/2010 | Ton |
| 2011/0146792 | A1 | 6/2011 | Wu et al. |
| 2011/0214226 | A1 | 9/2011 | Dundas |
| 2012/0255107 | A1 * | 10/2012 | Wu ........................ A47K 13/02 427/407.1 |
| 2014/0047627 | A1 * | 2/2014 | Wu ........................ A47K 13/24 4/242.1 |
| 2014/0215698 | A1 | 8/2014 | Wu |
| 2022/0348769 | A1 | 11/2022 | Wittich |

FOREIGN PATENT DOCUMENTS

| | | | | |
|---|---|---|---|---|
| CN | 101664289 | A | | 3/2010 |
| EP | 3424385 | A1 * | 1/2019 | |
| GB | 422797 | A | | 1/1935 |
| GB | 2021176 | A | | 11/1979 |
| GB | 2379407 | A * | 3/2003 | ....... B29C 45/14688 |
| GB | 2380444 | A | | 4/2003 |
| WO | 2004110743 | A1 | | 12/2004 |
| WO | WO-2012138425 | A2 * | 10/2012 | ............. A47K 13/02 |
| WO | WO-2014022472 | A2 * | 2/2014 | ............. A47K 13/02 |
| WO | 2019041295 | A1 | | 3/2019 |

OTHER PUBLICATIONS

First Office Action dated Mar. 11, 2016 in connection with Chinese Application No. 201280017458.7, 29 pages.
Extended European Search Report dated Feb. 16, 2015 in connection with European Patent Application No. 12767262.4, 6 pages.
Communication Pursuant to Rules 70(2) and 70a(2) EPC dated Mar. 5, 2015 in connection with European Patent Application No. 12767262.4, 1 page.
European Office Action dated Apr. 11, 2016 in connection with European Patent Application No. 12774191.6 6 pages.
Notification of Transmittal of the International Search Report of the International Searching Authority dated Jan. 25, 2013 in connection with International Patent Application No. PCT/US2012/025864, 3 pages.
Written Opinion of the International Searching Authority dated Jan. 25, 2013 in connection with International Patent Application No. PCT/US2012/025864, 5 pages.
Notification of Transmittal of the International Search Report and the Written Opinion of the International Searching Authority, or the Declaration dated Jan. 22, 2014 in connection with International Patent Application No. PCT/US2013/052847, 9 pages.
U.S. Office Action dated Jul. 1, 2015 in connection with U.S. Appl. No. 13/083,161, 9 pages.
U.S. Office Action dated Sep. 26, 2014 in connection with U.S. Appl. No. 13/083,161, 10 pages.
U.S. Office Action dated Mar. 11, 2016 in connection with U.S. Appl. No. 13/563,093, 8 pages.

* cited by examiner

TOILET LID AND SEAT COMPRISING FIBER REINFORCED CEMENT BOARD, FIBER REINFORCED CALCIUM SILICATE BOARD OR SINTERED STONE

TECHNICAL FIELD

The present disclosure is generally directed to toilet equipment, and more particularly to a toilet lid and seat that comprises fiber reinforced cement board, fiber reinforced calcium silicate board or sintered stone.

BACKGROUND

For toilet seats and lids currently available on the market, two types of materials are commonly used to make up the main part of the toilet seats and lids. The first type is wood materials such as molded wood and fiber boards, among which medium density fiber boards (MDF) plays a prominent role. The second type is thermoplastic materials such as urea formaldehyde (duroplast) and polypropylene (PP).

However, the predominant use of these two types of materials has a negative impact on the environment. The use of wood materials contributes to continued deforestation of forests and woods. Additionally, the material composition of MDF and molded wood contains a considerable amount, typically around 30% by weight, of glue that emits harmful formaldehyde. Furthermore, the use of thermoplastic materials, and non-recyclable thermoplastic materials in particular, contributes to an increased carbon footprint due to the use of crude oil during material production, and further contributes to plastic waste pollution.

Therefore, there is a need for more environmentally friendly and durable toilet lids and seats that eliminate the need for these two types of materials.

Toilet lids and seats are repeatedly subjected to substantially the whole weight of a person on a daily basis. However, typical toilet lids and seats made from wood or thermoplastic materials have limited durability and longevity, and hence must be regularly replaced, thus further negatively impacting the environment. Furthermore, a heavier weight of toilet lids and seats gives users confidence in the rigidity and stability of the toilet lids and seats. However, when using lighter wood and thermoplastic materials such as MDF and PP, increasing the weight of the toilet lids and seats by increasing the amount of material for the toilet lids and seats would lead to a significant increase in costs and thickness of the toilet lids and seats, and even further negatively impact the environment. Simultaneously, the toilet lids and seats must have improved strength, durability, and longevity to better withstand repeated use on a daily basis. At the same time, the toilet lids and seats must not be too heavy in weight, as otherwise, operation of the toilet lids and seats would become cumbersome for users.

Therefore, there is a need for toilet lids and seats that are more durable, long lasting, and heavier, without a significant increase in costs and thickness, and thus reducing their impact on the environment.

SUMMARY

Some or all of the above objectives are achieved by the disclosed embodiments as set out in the independent claims. Preferred embodiments are defined by the sub-features of the dependent claims.

In a 1st aspect, a toilet lid or seat comprises a core structural layer having a shape and size associated with the toilet lid, and having a first surface and a second surface opposite the first surface, wherein the core structural layer comprises or substantially consists of fiber reinforced cement board or fiber reinforced calcium silicate board.

The 1st aspect is advantageous because it provides an environmentally friendly toilet lid or seat that eliminates the need for wood materials and thermoplastic materials. The core structural layer provides the main material properties of the toilet lid or seat, and thus critically provides the material strength, durability, and longevity of the toilet lid or seat. Fiber reinforced cement boards are made from a material that substantially consists of a mix of organic fibers such as cellulose fibers, cement, and sand, while fiber reinforced calcium silicate boards are made from a material that substantially consists of a mix of organic fibers, cement, and silica. These two materials thus largely consist of rock based materials readily available in the earth's crust, and most importantly do not require any wood or thermoplastic materials. Furthermore, these two materials have a larger density than typically used wood materials such as MDF or thermoplastic materials such as PP, and thus increase the weight of the toilet lid or seat without increasing the thickness of the toilet lid or seat.

According to a 2nd aspect, in the first aspect, a first layer is disposed on the first surface of the core structural layer, and/or a second layer is disposed on the second surface of the core structural layer.

The 2nd aspect is advantageous because it allows the provision of further material characteristics to the toilet lid or seat, and provides further protection to the core structural layer against external influences.

According to a 3rd aspect, in the preceding aspect, the first layer and/or the second layer comprises or substantially consists of a painted layer or a coated layer.

The 3rd aspect is advantageous because a painted or coated layer provides a simple and effective means to protect the exterior surface(s) of the core structural layer against external influences, and further allows the exterior surface(s) to be decorated.

According to a 4th aspect, in the 2nd aspect, the first layer and/or the second layer comprises or substantially consists of a metal layer.

The 4th aspect is advantageous as the metal layer provides further stability, strength, and impact resistance to the toilet lid or seat. This is particularly advantageous for the toilet seat, as the toilet seat benefits from a stronger and more durable structure in comparison to the plate shaped toilet lid, due the provision of a central opening in the toilet seat. Furthermore, since fiber reinforced cement or calcium silicate boards are heavier than MDF or PP, the provision of a metal layer allows the thickness of the core structural layer to be reduced, thus preventing the overall weight of the toilet lid or seat from becoming too large.

According to a 5th aspect, in the 4th aspect, the first layer comprises or substantially consists of a painted layer or a coated layer, and the second layer comprises or substantially consists of a metal layer.

The 5th aspect is advantageous because it combines the advantages of the 2nd aspect and of the 4th aspect.

According to a 6th aspect, in the 4th or 5th aspect, the metal layer comprises or substantially consists of aluminum, or a metal alloy.

The 6th aspect is advantageous as the use of lightweight aluminum or metal alloys allows a wide range of material properties to be provided to the toilet lid and seats.

According to a 7th aspect, in the preceding aspect, the metal alloy is one of aluminum alloy, magnesium alloy, or titanium alloy.

The 7th aspect is advantageous as these alloys are lighter than commonly used stainless steel materials, and thus contribute to preventing the toilet lid or seat from becoming too heavy.

In an 8th aspect, a toilet lid comprises a core structural layer having a shape and size associated with the toilet lid, and having a first surface and a second surface opposite the first surface, wherein the core structural layer comprises or substantially consists of sintered stone.

The 8th aspect is advantageous because it provides an environmentally friendly toilet lid or seat that eliminates the need for wood materials or thermoplastic materials. The core structural layer provides the main material properties of the toilet lid or seat, and thus critically contributes the material strength and durability of the toilet lid or seat. Sintered stone is a material made from a mix of natural and recyclable materials such as sand, clay and quartz that are readily available from the earth's crust. The material mix is crushed under pressure and baked at over 1200° ° C. during material production. The 8th aspect is further advantageous because sintered stone has a larger density than wood materials such as MDF or thermoplastic materials such as duroplast, and thus increases the weight of the toilet lid or seat without increasing the thickness of the toilet lid or seat. Additionally, sintered stone has high compression strength, hardness, scratch resistance, chemical resistance, and water resistance, and thus improves the strength, durability, and longevity of the toilet lid or seat to decrease the impact on the environment.

According to a 9th aspect, in the preceding aspect, a first layer is disposed on the first surface of the core structural layer.

The 9th aspect is advantageous because it allows the provision of further material characteristics to the toilet lid or seat, and provides further protection to the core structural layer against external influences.

According to a 10th aspect, in the preceding aspect, the first layer comprises or substantially consists of a metal layer.

According to an 11th aspect, in the preceding aspect, the metal layer comprises or substantially consists of a metal alloy.

According to a 12th aspect, in the preceding aspect, the metal alloy is one of aluminum alloy, magnesium alloy, or titanium alloy.

The advantages of the 10th, 11th, and 12th aspect correspond respectively to the advantages of the 4th, 6th, and 7th aspect.

Preferred embodiments are now described, by way of example only, with reference to the accompanying drawings.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

It will be understood that embodiments of this disclosure may include any one, more than one, or all of the features described here. In addition, embodiments of this disclosure may additionally or alternatively include other features not listed here. Although the disclosed embodiments are described with respect to a toilet seat, such description is not limiting since the disclosed embodiments are suitable for a wide range of applications.

Figure 1:
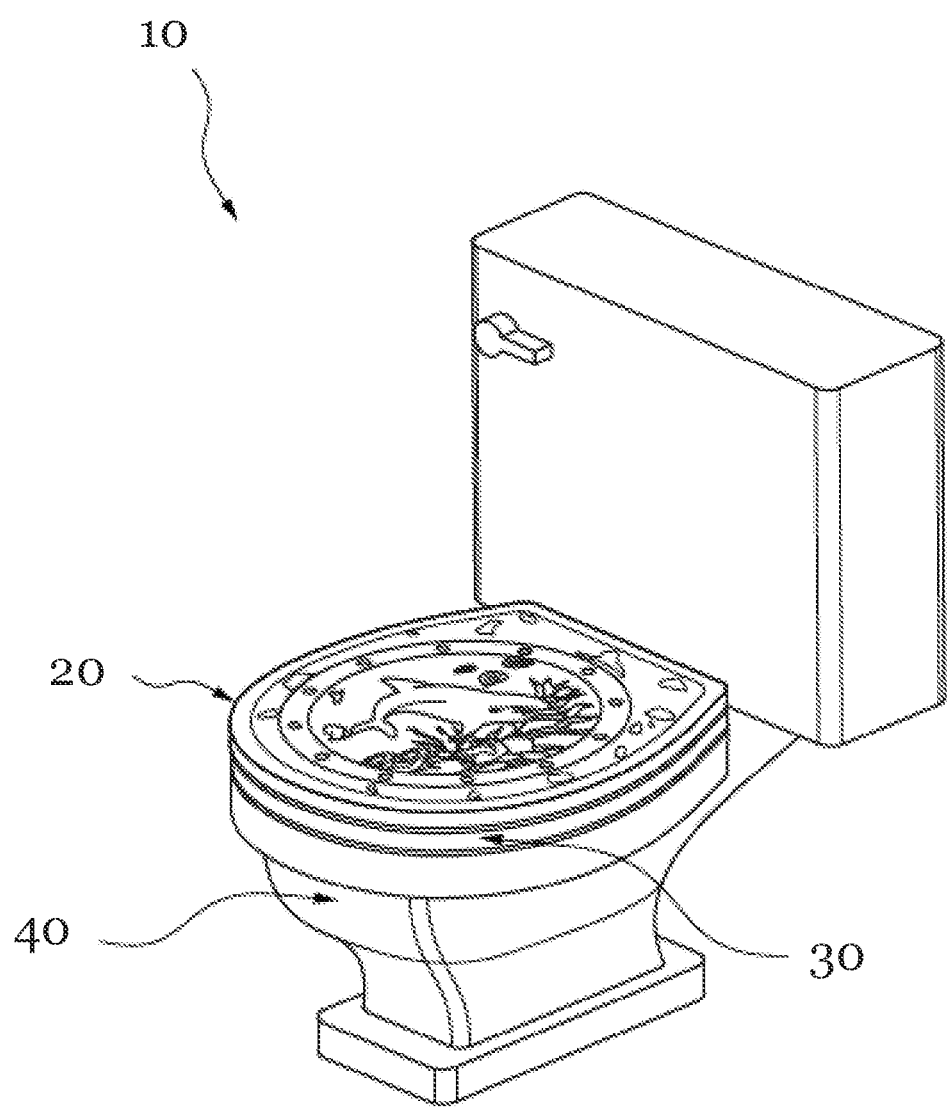
FIG. 1 illustrates a toilet that includes a toilet lid and/or seat according to embodiments of the present disclosure.

FIG. 1 illustrates a toilet that includes a toilet lid and/or a toilet seat according to embodiments of the present disclosure. As shown, a toilet 10 is provided with a toilet lid 20 and toilet seat 30 over a bowl 40. The toilet 10 may be any suitable toilet with a bowl that is configured to be covered by a seat and lid. The bowl 40 has an opening that is generally round or oval shaped. The bowl 40 may generally be of any suitable shape and size. The toilet lid 20 and toilet seat 30 generally have an overall size and shape configured to match the size and shape of the bowl 40, and to cover the opening of the bowl 40. The toilet lid 20 and toilet seat 30 are attached to a rear portion of the bowl 40 or toilet 10, preferably using hinged hardware that allows the toilet lid 20 and toilet seat 30 to raise and lower independently with respect to the bowl 40 and to each other, as is known in the art.

Figure 2:
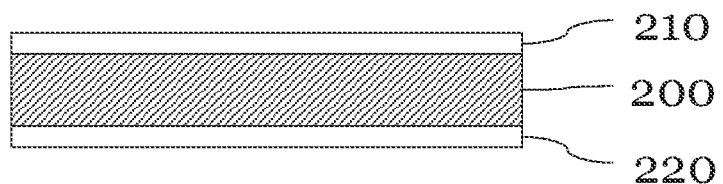
FIG. 2 illustrates a schematic cross-sectional view of a toilet lid with a core structural layer comprising or substantially consisting of fiber reinforced cement or calcium silicate board, according to embodiments of the present disclosure.

FIG. 2 illustrates a schematic cross-sectional view of a toilet lid 20 according to embodiments of the disclosure. However, the described structure may also be used for a toilet seat 30 according to embodiments of the disclosure.

In its simplest configuration, the toilet lid 20 substantially consists of a core structural layer 200 substantially made from fiber reinforced cement board (FCB) or fiber reinforced calcium silicate board (FCSB).

Since FCB and FCSB have a certain porosity that can negatively affect the toilet lid 20 if subjected to continuous and/or prolonged exposure to water, it is preferable to provide a first layer 210 on the upper surface of the core structural layer 200, and a second layer 220 on the lower surface of the core structural layer 200. The first layer 210 and/or the second layer 220 may provide a surface sealing effect and thus provide protection to the first and/or second surface of the core structural layer 200 against external influences such as water and humidity. In a preferred embodiment, the first layer 210 and/or the second layer 220 are a painted layer or coated layer. Painting or coating the upper and/or lower surface of the core structural layer 200 with a first layer 210 and/or second layer 220 using known techniques provides protection of the core structural layer 200 against external influences in a simple and cost-effective manner, and further allows the exterior surface of the toilet lid to be decorated with colors, patterns, graphics and the like.

In a preferred embodiment, the thickness of the toilet lid is between 10 to 12 mm.

Figure 3:
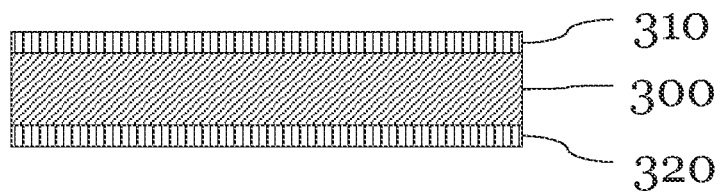
FIG. 3 illustrates a schematic cross-sectional view of a toilet seat with a core structural layer comprising or substantially consisting of fiber reinforced cement or calcium silicate board, according to embodiments of the present disclosure.

FIG. 3 illustrates a schematic cross-sectional view of a toilet seat 30 according to embodiments of the disclosure. However, the described structure may also be used for a toilet lid 20 according to embodiments of the disclosure.

In the same manner as described in the context of embodiments shown in FIG. 2, the core structural layer 300 substantially consists of FCB or FCSB, and is preferably provided with a first layer 310 and a second layer 320, although the first layer 310 can also be omitted. In a preferred embodiment, the first layer 310 and the second layer 320 are formed of a metal layer, preferably a metal plate. The metal layer increases the strength, durability, and longevity of the structure, which is particularly advantageous for toilet seats due to provision of the central opening. Furthermore, the metal layer prevents an increase in thickness of the core structural layer 300. This prevents the entire toilet seat 30 from becoming both too thick and heavy.

Preferred materials for the metal layer are aluminum, or metal alloys such as aluminum alloy, magnesium alloy, and titanium alloy. The use of aluminum or these metal alloys is particularly advantageous as it provides an increase in overall strength, durability, and longevity of the toilet lid comparable to the use of stainless steel. At the same time, aluminum and the aforementioned metal alloys are lighter than stainless steel and thus prevent the toilet seat from becoming too heavy to be comfortably used.

While both the upper layer 310 and the lower layer 320 can be provided as a metal layer, one of the upper layer 310 and the lower layer 320 may instead be a painted or coated layer that may additionally provide a surface sealing effect. Additionally, the exterior surface of the metal layer may further be provided with a painted or coated layer to further protect the metal layer against external influences. This may also serve to visibly mask the metal layer, and further allows the provision of decorative effects.

Preferably, the core structural layer 300 has a thickness of 8 to 12 mm. Additionally, a first layer 310 and/or a second layer 320 comprising or substantially consisting of a metal alloy may preferably have a thickness of 0.2 to 0.5 mm, while a first layer 310 and/or a second layer 320 comprising or substantially consisting of aluminum may preferably have a thickness of 0.2 to 1.0 mm. In a preferred embodiment, when both a first layer 310 and a second layer 320 both comprising or substantially consisting of a metal layer are provided, the first layer 310 may preferably have a thickness of 0.2 to 0.5 mm, and the second layer 320 may preferably have a thickness of 0.5 to 2 mm. The lower second layer 320 has a larger thickness as it is the second layer 320 that contributes significantly to the tensile strength of the toilet seat. This represents an optimal balance between strengthening the overall structure of the toilet seat, protecting the toilet seat against external influences, and preventing the toilet lid from becoming too heavy and too costly to manufacture.

Figure 4:
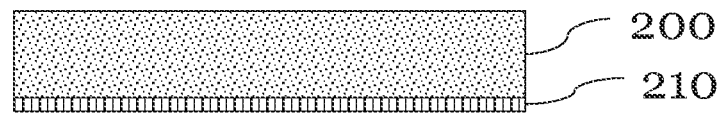
FIG. 4 illustrates a schematic cross-sectional view of a toilet lid or seat with a core structural layer comprising or substantially consisting of sintered stone, according to embodiments of the present disclosure.

FIG. 4 illustrates a schematic cross-sectional view of a toilet lid 20 according to embodiments of the disclosure. However, the described structure may also be used for a toilet seat 30 according to embodiments of the disclosure.

As shown, the toilet lid 20 is provided with a core structural layer 200 that comprises or substantially consists of sintered stone. While sintered stone has high compression strength, is hard, scratch resistant, chemical resistant, water resistant, and easy to clean, it is also more brittle when compared to FCB or FCSB. In order to increase the strength, toughness, and impact resistance of the toilet lid 20, it is preferable that a first layer 210 be provided on the lower surface of the core structural layer 200. Providing the first layer 210 on the lower surface contributes in particular to an increased tensile strength.

In a preferred embodiment, the first layer 210 may be a metal layer as described in the context of embodiments shown in FIG. 3, and may additionally have a thickness between 0.5 to 2 mm. Additionally, or alternatively, the core structural layer 200 comprising or substantially consisting of sintered stone preferably has a thickness between 5 to 7 mm.

In another preferred embodiment, the first layer 210 comprises or substantially consists of fiber reinforced cement board or fiber reinforced calcium silicate board, and may additionally have a thickness between 5 to 8 mm. A coated or painted layer may be disposed on the lower surface of the first layer 210 to provide further protection to the first layer 210 against external influences. Additionally, or alternatively, the core structural layer 200 comprising or substantially consisting of sintered stone preferably has a thickness between 3 to 6 mm.

Generally, some or all of the layers described in the context of embodiments shown in FIGS. 1 to 4 may be joined to each other using adhesives.

Generally, the toilet lids or seats as described for embodiments above, in particular in the context FIGS. 1 to 4, can be combined with each other to form a toilet lid and seat assembly. The above described toilet lids or seats according to embodiments of the disclosure may also be used in combination with a complementing lid or seat known in the art.

While this disclosure has described certain embodiments, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

What is claimed is:

1. A toilet lid comprising:
 a core structural layer having a shape and size associated with the toilet lid, and having a first surface and a second surface opposite the first surface,
 wherein the core structural layer comprises fiber reinforced cement board; and
 a metal strengthening layer covering the core structural layer.

2. The toilet lid according to claim 1, further comprising a painted layer covering the metal strengthening layer.

3. A toilet seat comprising:
 a core structural layer having a shape and size associated with the toilet seat, and having a first surface and a second surface opposite the first surface,
 wherein the core structural layer comprises fiber reinforced cement board; and
 a metal strengthening layer covering the core structural layer.

4. The toilet lid according to claim 1, wherein the metal strengthening layer comprises aluminum, or a metal alloy.

5. The toilet lid according to claim 4, wherein the metal alloy is one of aluminum alloy, magnesium alloy, or titanium alloy.

6. A toilet lid comprising:
 a core structural layer having a shape and size associated with the toilet lid, and having a first surface and a second surface opposite the first surface, wherein the core structural layer comprises sintered stone; and
 a metal strengthening layer covering the core structural layer.

7. The toilet lid according to claim 6, wherein the metal strengthening layer comprises one or more of aluminum, or a metal alloy.

8. The toilet lid according to claim 7, wherein the metal alloy is one of aluminum alloy, magnesium alloy, or titanium alloy.

9. The toilet lid according to claim 6, wherein the core structural layer further comprises one or more of: fiber reinforced cement board or fiber reinforced calcium silicate board.

10. An apparatus comprising:
 a toilet lid, the toilet lid comprising:
  a first core structural layer having a shape and size associated with the toilet lid, and having a first surface and a second surface opposite the first surface, wherein the first core structural layer comprises fiber reinforced cement board;
 a toilet seat pivotably connected to the toilet lid, the toilet seat comprising:
  a second core structural layer having a shape and size associated with the toilet seat, and having a first surface and a second surface opposite the first surface, wherein the first core structural layer comprises fiber reinforced cement board; and
  a strengthening metal layer disposed on an exterior of the second core structural layer.

11. The apparatus of claim 10, wherein the strengthening metal layer comprises at least one of: aluminum, magnesium, titanium or alloys thereof.

12. The apparatus of claim 10, wherein the second core structural layer comprises at least one of: reinforced cement board or fiber reinforced calcium silicate board.

13. The toilet seat according to claim 3, wherein the metal strengthening layer comprises aluminum, or a metal alloy.

14. The toilet seat according to claim 13, wherein the metal alloy is one of aluminum alloy, magnesium alloy, or titanium alloy.

* * * * *